(No Model.) 5 Sheets—Sheet 1.

G. H. GILBERT.
KNITTING MACHINE.

No. 468,513. Patented Feb. 9, 1892.

Witnesses:
Hamilton D. Turner.
Wm. D. Conner.

Inventor:
George H. Gilbert
by his Attorneys
Howson & Sons (No Model.) 5 Sheets—Sheet 2.
G. H. GILBERT.
KNITTING MACHINE.
No. 468,513. Patented Feb. 9, 1892.
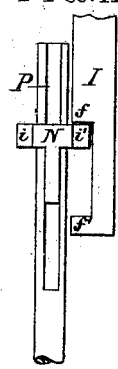
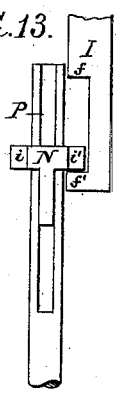
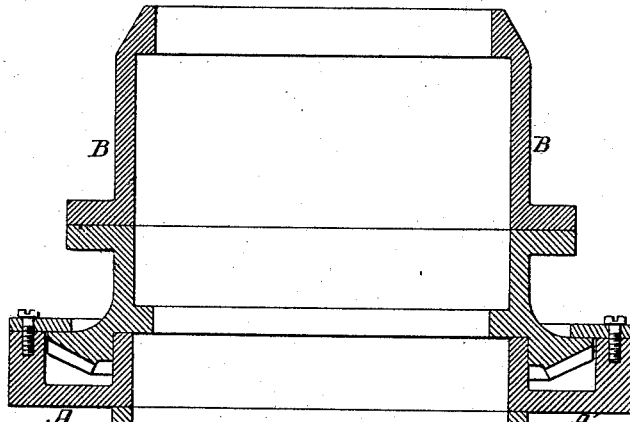
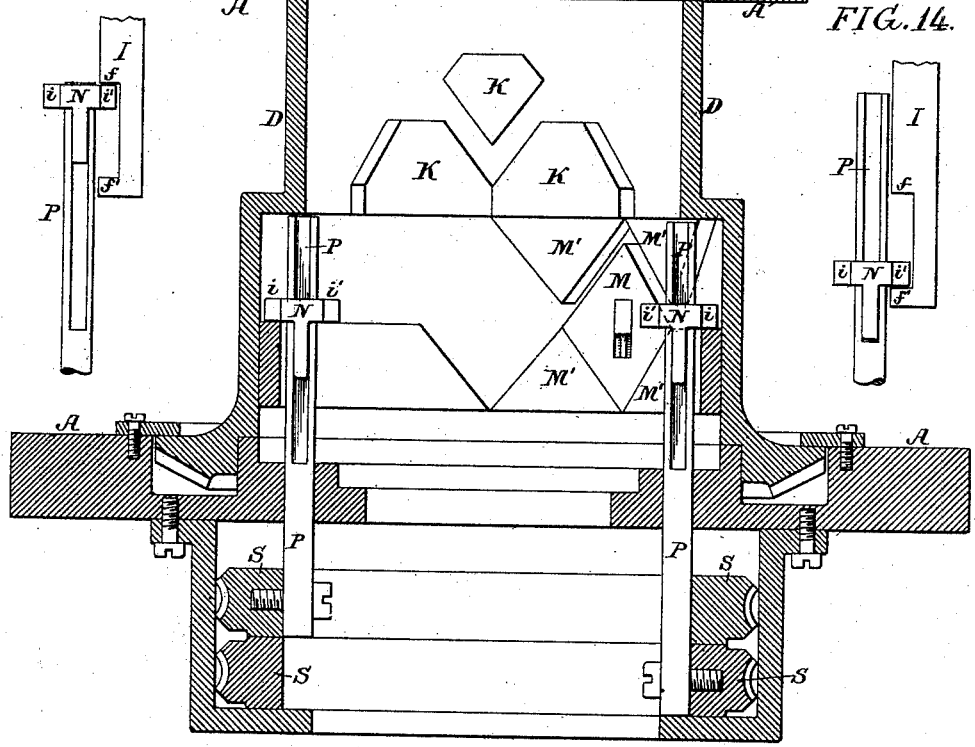
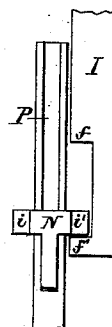
Witnesses:
Hamilton D. Turner.
William D. Conner.
Inventor:
George H. Gilbert
by his Attorneys
Howson & Sons (No Model.) 5 Sheets—Sheet 3.

G. H. GILBERT.
KNITTING MACHINE.

No. 468,513. Patented Feb. 9, 1892.

Witnesses:
William D. Conner.
Hamilton D. Turner.

Inventor:
George H. Gilbert
by his Attorneys
Howson & Sons (No Model.)

G. H. GILBERT.
KNITTING MACHINE.

No. 468,513. Patented Feb. 9, 1892.

Witnesses:
William D. Connor.
Hamilton D. Turner.

Inventor:
George H. Gilbert
by his Attorneys
Howson & Sons (No Model.)

G. H. GILBERT.
KNITTING MACHINE.

No. 468,513. Patented Feb. 9, 1892.

Witnesses:
Hamilton D Turner
William D. Bonner

Inventor:
George H. Gilbert
by his Attorneys
Howson & Sons

UNITED STATES PATENT OFFICE.

GEORGE H. GILBERT, OF PHILADELPHIA, PENNSYLVANIA, ASSIGNOR TO THE KILBOURN KNITTING MACHINE COMPANY.

KNITTING-MACHINE.

SPECIFICATION forming part of Letters Patent No. 468,513, dated February 9, 1892.

Application filed March 10, 1887. Serial No. 230,324. (No model.)

*To all whom it may concern:*

Be it known that I, GEORGE H. GILBERT, a citizen of the United States, and a resident of Philadelphia, (Germantown,) Pennsylvania, have invented certain Improvements in Knitting-Machines, of which the following is a specification.

My invention relates to that class of knitting-machines which are used for the production of knitted tubes with pockets or protuberances thereon to form the heels or toes of stocking-blanks, the objects of my invention being to provide for the rapid formation of the continuous tubes in machines of this class, to permit the use of two or more colors in said tube, and to provide simple means for automatically throwing into and out of action the needles which effect the narrowing and widening operations by which the pocket or protuberance is formed upon the tube.

Figure 1:
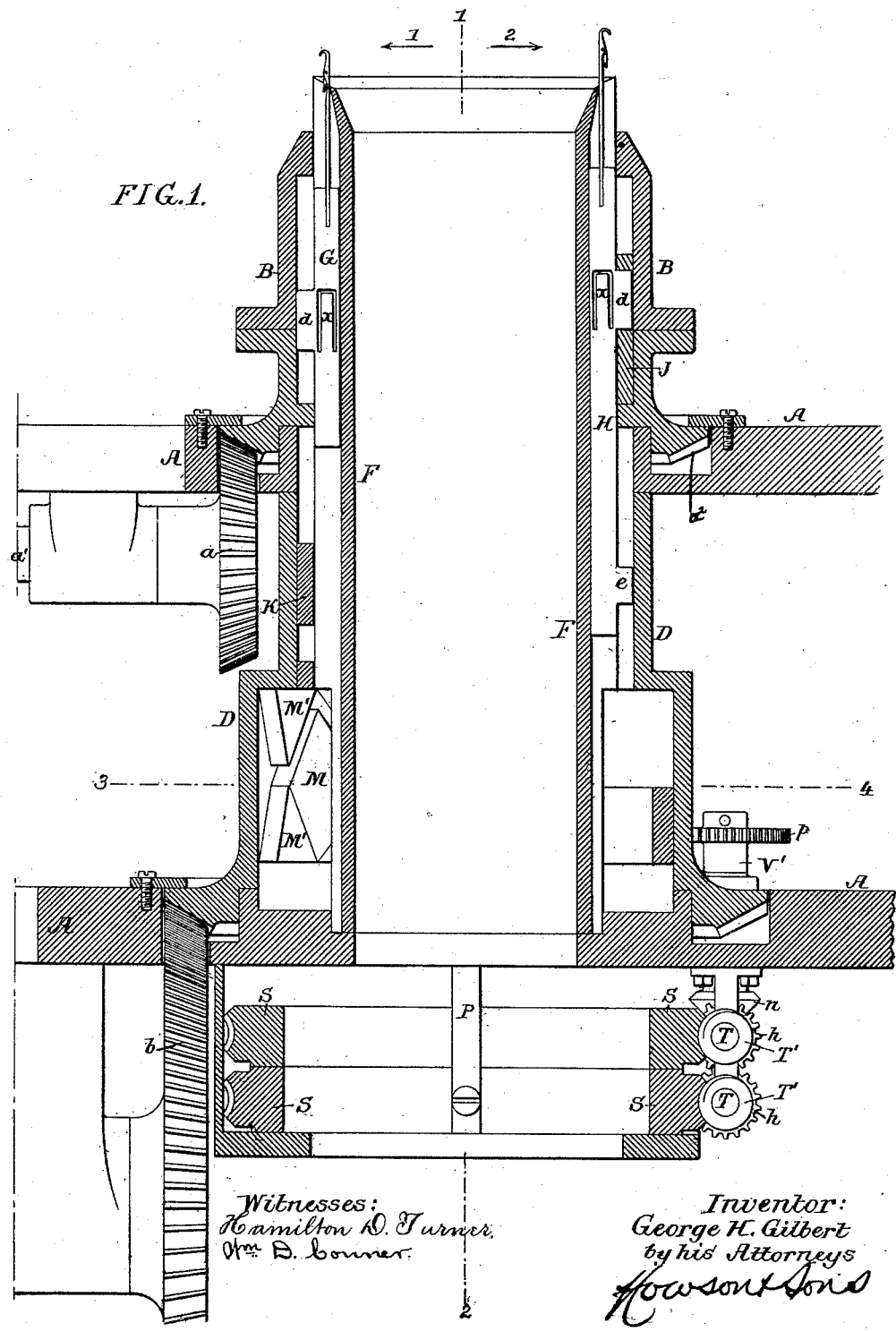
Figure 3:
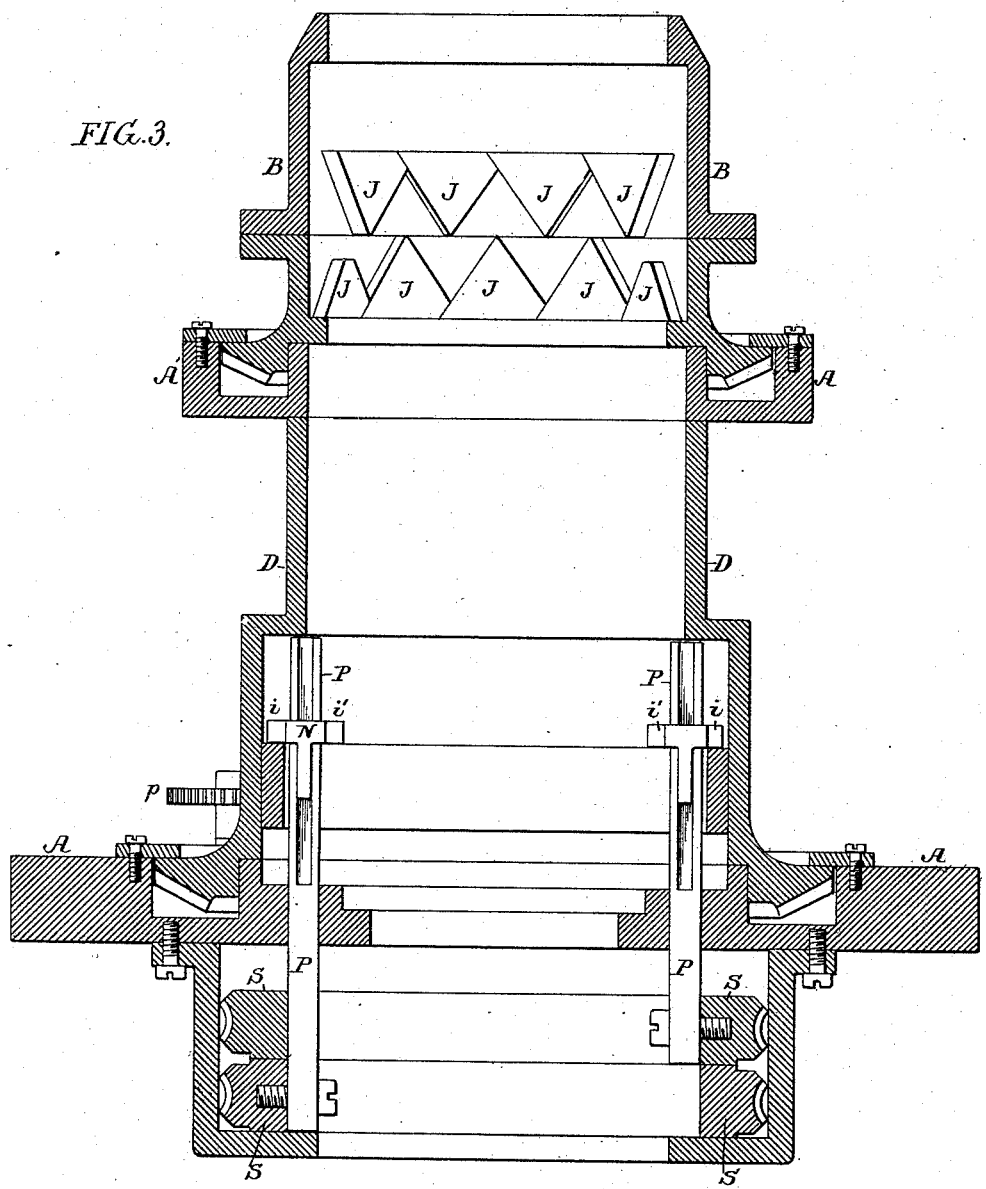
Figure 4:
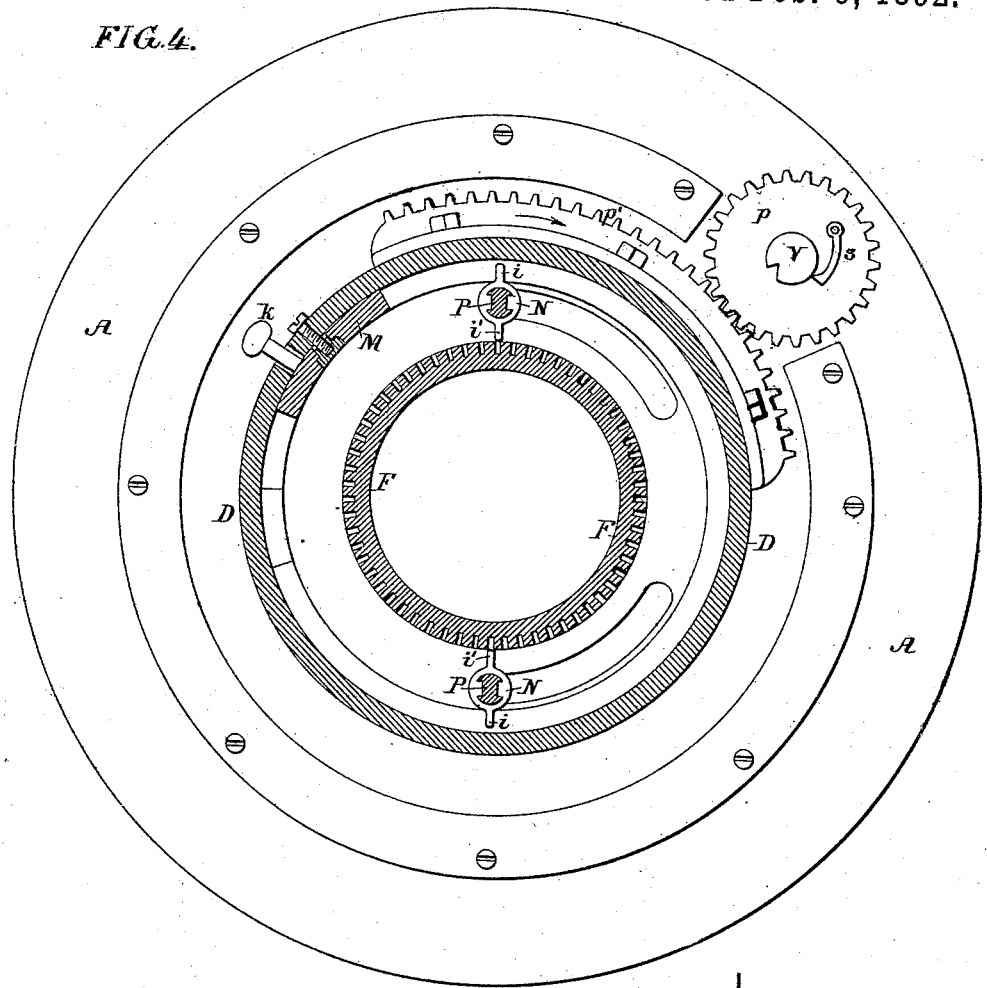
Figure 5:
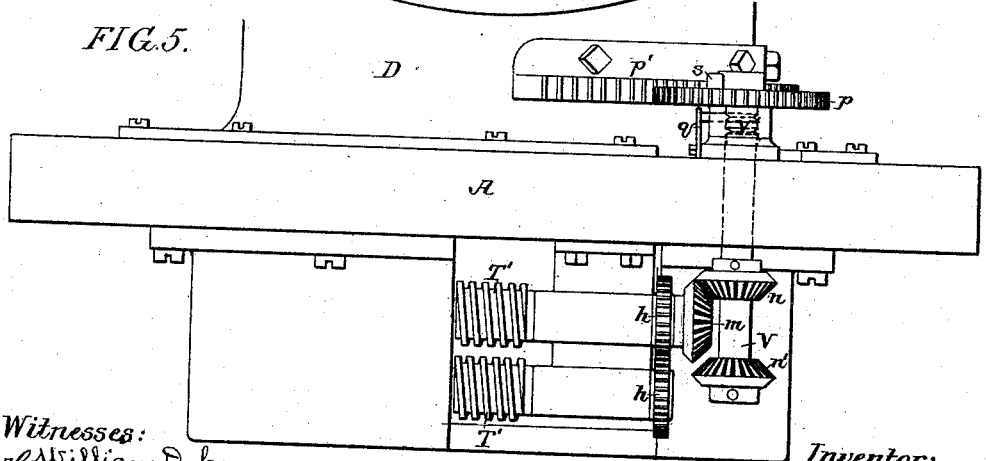
Figure 6:
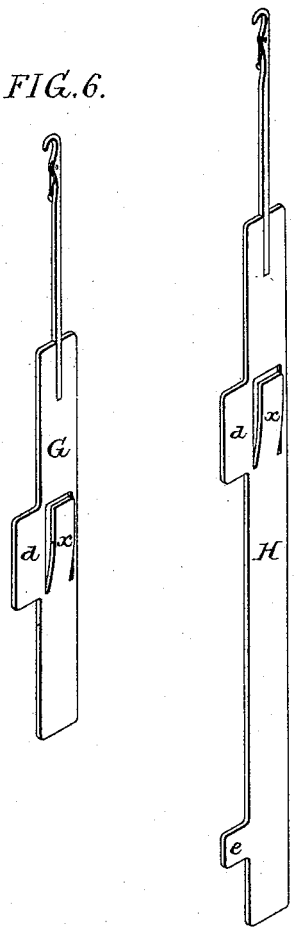
Figure 7:
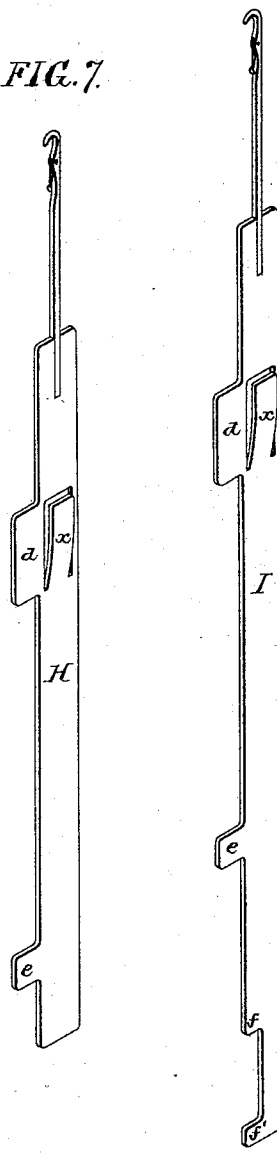
Figure 8:
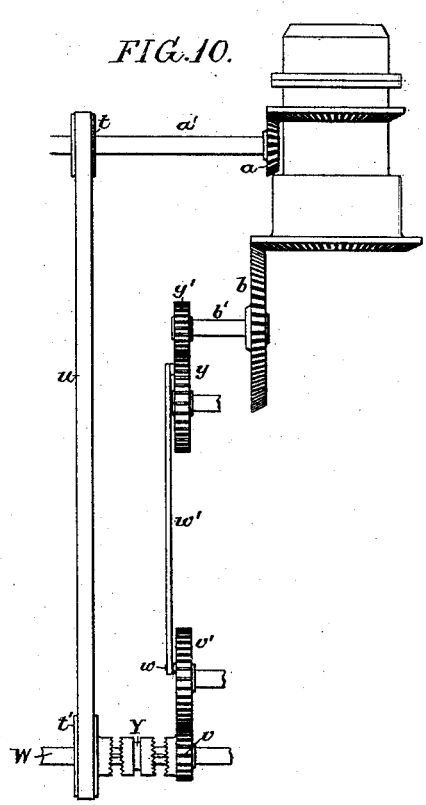
Figure 10:
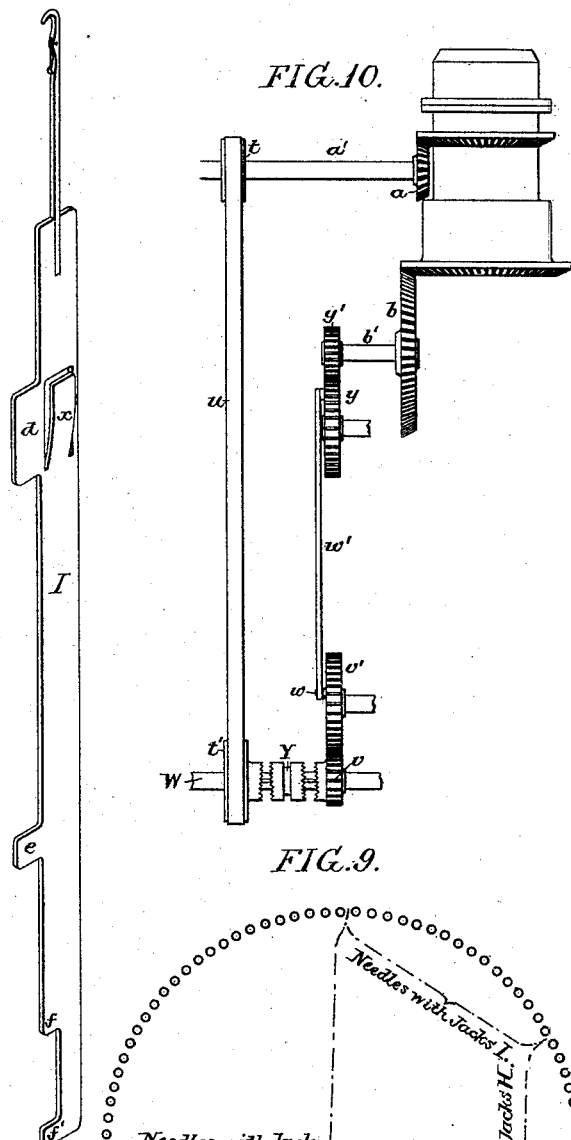
Figure 9:
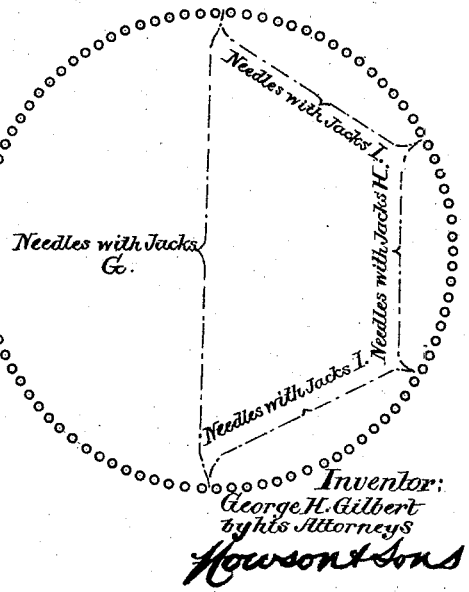

In the accompanying drawings, Figure 1 is a longitudinal section of a knitting-machine constructed in accordance with my invention. Fig. 2 is a transverse section of the same on the line 1 2 of Fig. 1, looking in the direction of the arrow 1, the needle-cylinder and driving-gears being removed; Fig. 3, a similar section looking in the direction of the arrow 2, Fig. 1; Fig. 4, a sectional plan on the line 3 4, Fig. 1; Fig. 5, a side elevation of part of the machine; Figs. 6, 7, and 8, perspective views of the needles employed in the machine; Fig. 9, a diagram illustrating the disposition of said needles on the needle-cylinder; Fig. 10, a diagram illustrating one form of gearing for driving the cam-rings of the machine; and Figs. 11 to 14, inclusive, diagrams illustrating the operation of part of the machine.

A is the fixed frame of the machine in suitable bearings in which are free to turn an upper cam-ring B and a lower cam-ring D, the upper ring being driven by a bevel-pinion $a$ on a shaft $a'$, which should be provided with suitable means for imparting a rotating movement thereto, the ring D being driven by a bevel-wheel $b$ on a shaft $b'$, which should be provided with means whereby it can be rocked or receive a movement of partial rotation. The two cam-rings are held a space apart, so that the movement of one cannot impart movement to the other. In this instance a part of the frame of the machine encircles the needle-cylinder between the two cam-rings and forms the support for the upper ring B. This part of the frame is designated in the drawings by the reference-letter $A'$ and for convenience is termed a "ring." This ring has an extension at one side, which is provided with a bearing for shaft $a'$, as shown in Fig. 1, which operates the cam-ring B. The ring $A'$ is also provided with an annular recess $a^2$ to receive the flange at the lower end of the cam-ring B, which is provided with gear-teeth to engage the bevel-pinion $a$.

The needle-cylinder F extends down through the cam-rings B and D and is provided with needles having three different styles of needle-jacks G, H, and I, each jack, however, having struck up from it a spring-finger $x$, which is bent laterally beyond the jack, so as to have a bearing against the side wall of the slot in which said jack is reciprocated, each needle thereby having an inherent tendency to remain in the position to which it has been adjusted until it is removed therefrom by the action of one of the cams. Some of the needles—say about one-half—have jacks G with single bits $d$, while others have jacks H with two bits $d\ e$, and still others have jacks I with bits $d\ e$ and $f\ f'$, the preferable disposition of the needles being that represented in Fig. 9.

The cam-ring B of the machine has at one side a series of cams J, and the upper bits $d$ of all the needle-jacks are in position to be acted upon by these cams, which, however, do not extend quite half-way around the ring, the other half being blank, so that around this half of the cylinder the cams J exercise no control over the needles when the cam-ring B is stationary.

The needles, having jacks with bits $e$, are under the control of cams K, carried by the upper portion of the cam-ring D. When the cam-ring B is being operated, the cam-ring D is stationary and is adjusted so that the cams K are on that side of the needle-cylinder having needles with short jacks G, the bits $e$ of the jacks H and I being free from engagement with the cams. (See Fig. 1.) The needles are therefore controlled entirely by the cams J of the ring B, and the machine works in a manner similar to an ordinary circular-knitting machine having a number of feeds arranged around one-half of the head. When it is desired to form a protuberance upon the tube, however, the ring B is thrown out of action and is adjusted so that its cams are on that side of the needle-cylinder having needles with jacks G. The ring D is then reciprocated so as to carry its cams around the other half of the cylinder, so that one half of the needles—that is to say, the half having jacks H and I—will be under control of the cams K, and stitches will be formed on this half only of the needles.

To form a pocket or bag upon the tube, it is necessary that the outer needles of the set shall be thrown out of action in succession, and then thrown into action again in reverse order. It is for this reason that some of the needles have jacks I with bits $f f'$. These bits are below the cams K and are contained in an expanded lower portion of the cam-ring D, within which is a vertically-movable cam M, which acts, in connection with upper and lower fixed cams M', upon fingers $i$, projecting outward from slides N, adapted to and free to move vertically in tubular carriers P, mounted upon worm-wheels S, suitably supported in the frame of the machine beneath the cam-ring D. These slides N have inwardly-projecting fingers $i'$, which are contained in the space between the bits $f f'$ of the needle-jacks I, so that on each reciprocation of the cam-ring D, each of the slides N will be lifted from its normal or intermediate position and then depressed, so as to again assume this position, or will be depressed from the latter position and then elevated, the movement of the slide depending upon whether the cam M is adjusted to the depressed position shown in Figs. 1 and 2, or to an elevated position the reverse of that shown, a stem $k$ projecting from the cam through a slot in the ring D, as shown in Fig. 4, so as to permit either adjustment of the cam.

In starting, the operation of forming a pocket upon the tube all of the jacks H and I are depressed, the bits $f$ of the jacks I being just above the fingers $i'$ of the slides N, as shown in Fig. 11. The cam M is somewhat in advance of the cams K of the ring D, and in performing the narrowing operation said cam is adjusted to the depressed position shown in Fig. 2, so that on each forward movement of the ring D each of the slides N will first be elevated from its normal position, and then returned to this position by reason of the action of the cam M and upper cams M'. As the slide rises, its finger $i'$ will act upon the bit $f$ of the jack I in line with the slide, as shown in Fig. 12, and the said jack will consequently be lifted, so that the bit $e$ is clear of the cams K, and the needle carried by the jack will not be actuated to form the stitch. By a proper movement of the worm-wheels S the outside needles at each end of the set may be brought successively under the action of the slides N, and the gradual narrowing of the fabric thus effected until all of the jacks I have been raised, the lower bits $f'$ of the same being under such circumstances directly under the fingers $i'$ of the slides N when the latter are in their normal position. (See Fig. 13.) The cam M is now shifted to the elevated position and the motion of the worm-wheels S is reversed. The slides N will now be first depressed and then returned to their normal position by the action of the cam M and lower cams M', and the jacks I, commencing at the jacks $l l$, Fig. 9, and working outward in each direction therefrom, will be successively drawn down, so as to bring their bits under the influence of the cams K, the gradual widening of the fabric being thus effected until all of the jacks I are depressed.

In order to effect the movement of the worm-wheels S, shafts T, suitably geared together by spur-wheels $h h$, carry worms T', gearing into said worm-wheels S, and one of said shafts has a bevel-pinion $m$, which may be caused to gear with either of two bevel-pinions $n n'$ on a shaft V, which is carried by and is adjustable vertically in a sleeve V', secured to the fixed frame A, any suitable catch being used to retain the shaft in the position to which it may be adjusted in the sleeve. For instance, the spring-pin $q$ may be adapted to either of two grooves formed in the shaft V, as shown by dotted lines in Fig. 5. The upper end of the shaft V has a spur-wheel $p$, with which engages a segment $p'$ on the lower-cam ring D, the wheel $p$ being loose on the shaft and being provided with a clutch $s$, engaging with said shaft, so that when moved in one direction the wheel will have no effect upon the shaft; but when moved in the opposite direction will turn the shaft, the extent of movement being sufficient to impart one rotation to each of the shafts T T, and consequently to move the worm-wheels S to the extent of one tooth In order to reverse the direction of movement it is simply necessary to move the shaft V, so as to throw the upper pinion $n$ out of gear with the pinion $m$ and bring the lower pinion $n'$ into gear therewith, or vice versa, the width of the segment $p'$ being sufficient to permit this movement without throwing the wheel $p$ out of gear therewith.

It will be observed that by reason of the clutch $s$ the worm-wheels S will be moved only as the ring D approaches the end of its rearward movement, the slide-carriers P being thereby shifted, so as to bring the slides into position to act on fresh needle-jacks on the next forward movement, thus insuring two courses of stitches between each two changes.

I employ screws and worm-wheels to move the shifter-slides from needle to needle, for the reason that their action is positive, and after having been turned to effect the movement desired they serve to hold the said slides in the position desired and prevent their accidental displacement.

I do not limit myself to any specific mechanism for operating the shafts $a'$ and $b'$ from a single driving-shaft; but in Fig. 10 I have shown one form of gearing, which may be adopted. The shaft $a'$ has a pulley $t$, which is connected by a belt $u$ to a pulley $t'$, loose on the driving-shaft W. Loose on said shaft is also a spur-wheel $v$, which gears into spur-wheel $v'$, having a crank-pin $w$ connected by a rod $w'$ to a pin on a large wheel or segment $y$, which gears into a spur-wheel $y'$ on the shaft $b'$, the crank-wheel $v'$ and segment $y$ being so proportioned that a vibrating movement only will be imparted to the latter. Sliding on the shaft W is a clutch-sleeve Y, which is splined to the shaft and can be caused to engage either with a clutch-face on the pulley $t'$ or with a clutch-face upon the spur-wheel $v$, or can be moved to an intermediate position, free from engagement with either of said clutch-faces.

The machine above described is not shown fitted with a thread-guide operating automatically for reciprocating work; but it will be obvious to those skilled in the art that the construction here shown may be operated by passing a thread to and fro by hand, so as to be taken by the needles, as has heretofore been done with flat or straight knitting machines.

I do not herein claim the combination of two cam-rings, one above the other, with a needle-cylinder having needles, all of which have bits engaging with the cams of one ring, a portion only of the needles having secondary bits engaging with the cams of the other ring, these latter needles being movable into and out of operative relation with their actuating-cams; or such parts combined with mechanism for rotating the cam-ring which actuates all the needles and mechanism for reciprocating the cam-ring which controls only a portion of the needles; or the combination, with a needle-cylinder and its needles, a cam-ring having cams whereby each needle is operated two or more times during each rotation of the said ring, a supplementary cam-ring whereby certain of the needles are operated once on each reciprocation of said ring, and devices for rotating the main cam-ring and reciprocating the supplementary cam-ring, the needles being movable in the needle-cylinder independently of the supplementary cams, whereby they may be removed from and restored to the influence of said cams, as such combinations are claimed in my patent, No. 398,145, dated February 19, 1889.

I claim as my invention—

1. The herein-described circular-knitting machine having a circular series of needles and two cam-cylinders for operating said needles held out of contact with each other.

2. The herein-described circular-knitting machine having a circular series of needles and two cam-cylinders for operating said needles, held out of contact with each other by a stationary construction interposed between them.

3. The herein-described circular-knitting machine having a circular series of needles and two cam-cylinders for operating said needles separated from each other by a stationary ring interposed between them.

4. The combination, in a circular-knitting machine, with a series of needles and means, including needle-actuating cams, for operating the needles for continuous circular work and for reciprocating work, as required, of narrowing and widening devices co-operative with the cam in action during the reciprocating work and including worm-gearing, through which the lateral movement of a part of such devices from needle to needle is imparted.

5. The combination, in a circular-knitting machine, with a series of needles and means for operating the needles for continuous circular work and for reciprocating work, as required, of automatic devices operative during the reciprocating knitting for first narrowing by causing certain needles successively to be made inoperative and then widening by causing the said needles to be made operative again and including worm-gearing for moving a part of the said devices from needle to needle.

6. The combination, in a circular-knitting machine, with a series of needles and means, including needle-actuating cams, for operating the needles for continuous circular work and for reciprocating work, as required, of automatic devices co-operative with the cam in action during reciprocating work for first narrowing by causing certain needles successively to be made inoperative and then for widening by causing said needles to be made operative again and including worm-gearing for moving a part of the said devices from needle to needle.

7. A circular-knitting machine having two or more needle-operating cams which are operative during circular work, a needle-operating cam operative to effect knitting during reciprocating work, which is stationary during circular work, devices for operating the machine for continuous circular work and for actuating the said cam for reciprocating work, as required, and narrowing and widening devices, substantially as described.

8. A circular-knitting machine having two or more needle-operating cams which are operative during circular work, a needle-operating cam operative during reciprocating work, which is stationary during circular work, devices for operating the machine for continuous circular work and for actuating the said cam for reciprocating work, and automatic devices co-operative with the cam in action during reciprocating work for first narrowing by causing certain needles successively to be made inoperative and then widening by causing said needles to be made operative again and including worm-gearing for moving a part of the said devices from needle to needle, substantially as described.

9. A circular-knitting machine having two or more cams operative during circular work, a needle-operating cam operative during reciprocating work, which is stationary during circular work, devices for operating the machine for circular work, devices for actuating the said cam for reciprocating work, means for changing from one movement to the other, and narrowing and widening devices, substantially as described.

10. A circular-knitting machine having a circular series of needles, two or more needle-operating cams which are operative during circular work, but all of which are thrown out of operation during reciprocating work, a cam operative during reciprocating work, but which is thrown out of operation during circular work, devices for operating the machine for continuous circular work, devices for actuating said cam for reciprocating work, and automatic narrowing and widening devices, substantially as described.

11. A circular-knitting machine having two or more needle-operating cams which are operative during circular work, a needle-operating cam operative during reciprocating work, which is stationary during circular work, devices for operating the machine for continuous circular work, devices for actuating said cam for reciprocating work, and automatic narrowing and widening devices connected with said reciprocating devices, substantially as described.

12. A circular-knitting machine organized for circular and reciprocating work, having a plurality of needle-operating cams, two or more of which are in operation during circular work, whereby two or more rows of stitches are formed during each revolution of the rotary parts of the machine, a part of the needle-cams of the machine being out of operation during reciprocating work, automatic narrowing and widening mechanism, including worm-gearing for moving and holding parts of such automatic mechanism from displacement, and actuating mechanism whereby the machine is operated for continuous circular and reciprocating work, substantially as described.

13. A circular-knitting machine organized for circular and reciprocating work, having a plurality of needle-operating cams, two or more of which are in operation during circular work, whereby two or more rows of stitches are formed at each revolution of the rotary parts of the machine, a part of the cams being out of operation during reciprocating work, automatic narrowing and widening devices, and suitable actuating mechanism whereby the machine is operated for continuous circular and reciprocating work and whereby the machine may be changed from one movement to the other, substantially as described.

14. A circular-knitting machine organized for circular and reciprocating work, having a plurality of needle-operating-cams, two or more of which are in operation during circular work, thereby forming two or more rows of stitches at each revolution of the rotary parts of the machine, a part of the needle-cams of the machine being out of operation during reciprocating work, automatic narrowing and widening devices, and actuating mechanism whereby the machine is operated for continuous circular and reciprocating work, substantially as described.

15. A circular-knitting machine having a plurality of needle-operating cams and forming two or more rows of stitches at each revolution of the machine in performing circular work, a part of which cams are thrown out of operation during reciprocating work, one of its cams operating during reciprocating work, means for reciprocating said cam, narrowing and widening devices, and actuating means therefor operating the same while the reciprocating cam is actuated, substantially as described.

16. A circular-knitting machine having two or more needle-operating cams which are thrown out of operation during reciprocating work, a needle-cam operating during reciprocating work, means for reciprocating said cam, narrowing and widening devices, and actuating mechanism therefor, including worm-gearing operating while the reciprocating cam is actuated, substantially as described.

17. In a circular-knitting machine, the combination, with the needle-cylinder and its needles, of two cam-rings, one having two or more cams for circular work and the other a cam for reciprocating work, and automatic narrowing and widening devices, substantially as described.

18. In a circular-knitting machine, the combination, with the needle-cylinder and its needles, of two or more cams for circular work, a cam for reciprocating work, shifter-slides, mechanism for moving said slides from needle to needle, and cam-grades for reciprocating said slides in the direction of the needles, substantially as described.

19. In a circular-knitting machine, the combination, with the needle-cylinder and its needles, of a cam-ring having two or more cams for circular work, shifter-slides, means for moving said slides from needle to needle, and a cam-ring having a cam for reciprocating work and cam-grades for reciprocating said slides in the direction of the needles.

20. The combination of a needle-cylinder having needles with bits for the action of an operating-cam and supplementary bits for the action of a shifter-slide, a slide for acting on said supplementary bits, means for moving said slide from needle to needle, and a cam-ring D, having upper cams for acting on the bits of the needles and lower cams constructed to impart a positive movement in both directions to the shifter-slide, all substantially as specified.

21. The combination of a needle-cylinder having needles with bits for the action of an operating-cam, and supplementary bits for the action of a shifter-slide, the slide for acting on said supplementary bits, a cam-ring D, having upper cams for acting on the bits of the needles, and lower cams constructed to impart a positive movement in both directions to the shifter-slide, a worm-wheel having guides for the shifter-slide, a worm operating said wheel, and means for turning said worm first in one direction and then in the opposite direction, all substantially as specified.

22. The combination of a cam-ring D, having upper and lower cams, a needle-cylinder having needles with bits for the action of the upper cams of said ring, and jacks projecting below said bits, a shifter-slide having an inwardly-projecting finger for acting on said projecting jacks and an outwardly-projecting finger for engaging with the lower cams of the ring D, a slide-carrier, and means for moving the latter in a segmental path between the circumferential line of the lower cams and that of the projecting jacks of the needles, all substantially as specified.

23. The combination, in a knitting-machine, of a needle-cylinder having needles, all of which have a single range of bits, some of the needles having also a secondary range of bits and still others a third range of bits, shifter-slides for acting on said third range of bits, means for moving said shifter-slides from needle to needle, an upper ring having cams for acting on the first range of bits, a lower ring having cams for acting on the second range of needle-bits and other cams for operating the shifter-slides, and mechanism for rotating the upper cam-ring and for reciprocating the lower cam-ring, all substantially as specified.

24. The combination of the needle-shifters, and the worm-wheels carrying the same, a cam-ring having a rack, a shaft having a loose pinion gearing into said rack, a clutch for securing said pinion to the shaft during its movement in one direction, and gearing whereby the movement of said shaft is transmitted to the worm-wheels, all substantially as specified.

25. The combination of the needle-cylinder and its needles, a cam-ring having cams whereby each needle is operated two or more times on each rotation of said ring, a supplementary cam-ring whereby certain of the needles are operated once on each reciprocation of said ring, means for removing needles from and restoring them to the influence of said supplementary ring, and devices for rotating the main cam-ring and reciprocating the supplementary cam-ring, all substantially as specified.

In testimony whereof I have signed my name to this specification in the presence of two subscribing witnesses.

GEO. H. GILBERT.

Witnesses:
WILLIAM D. CONNER,
HARRY SMITH.